J. E. PHARO & W. S. BENJAMIN.
FISH TRAP.
APPLICATION FILED JAN. 12, 1912.
1,062,849.
Patented May 27, 1913.
2 SHEETS—SHEET 1.
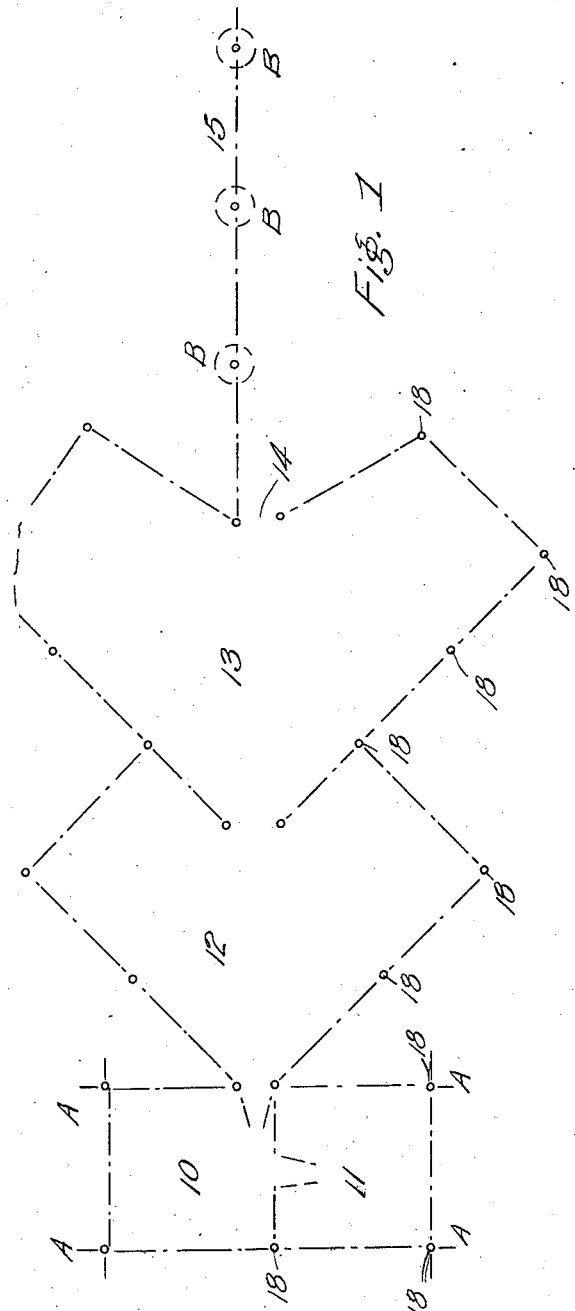
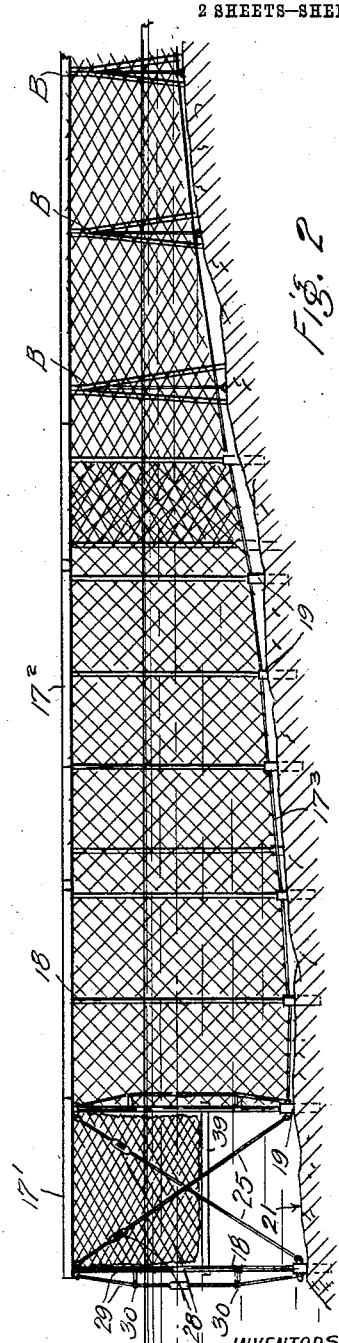
WITNESSES:
E. Peterson
F. C. Matheny
INVENTORS:
James E. Pharo and
William S. Benjamin
BY
Pierre Barnes
ATTORNEY

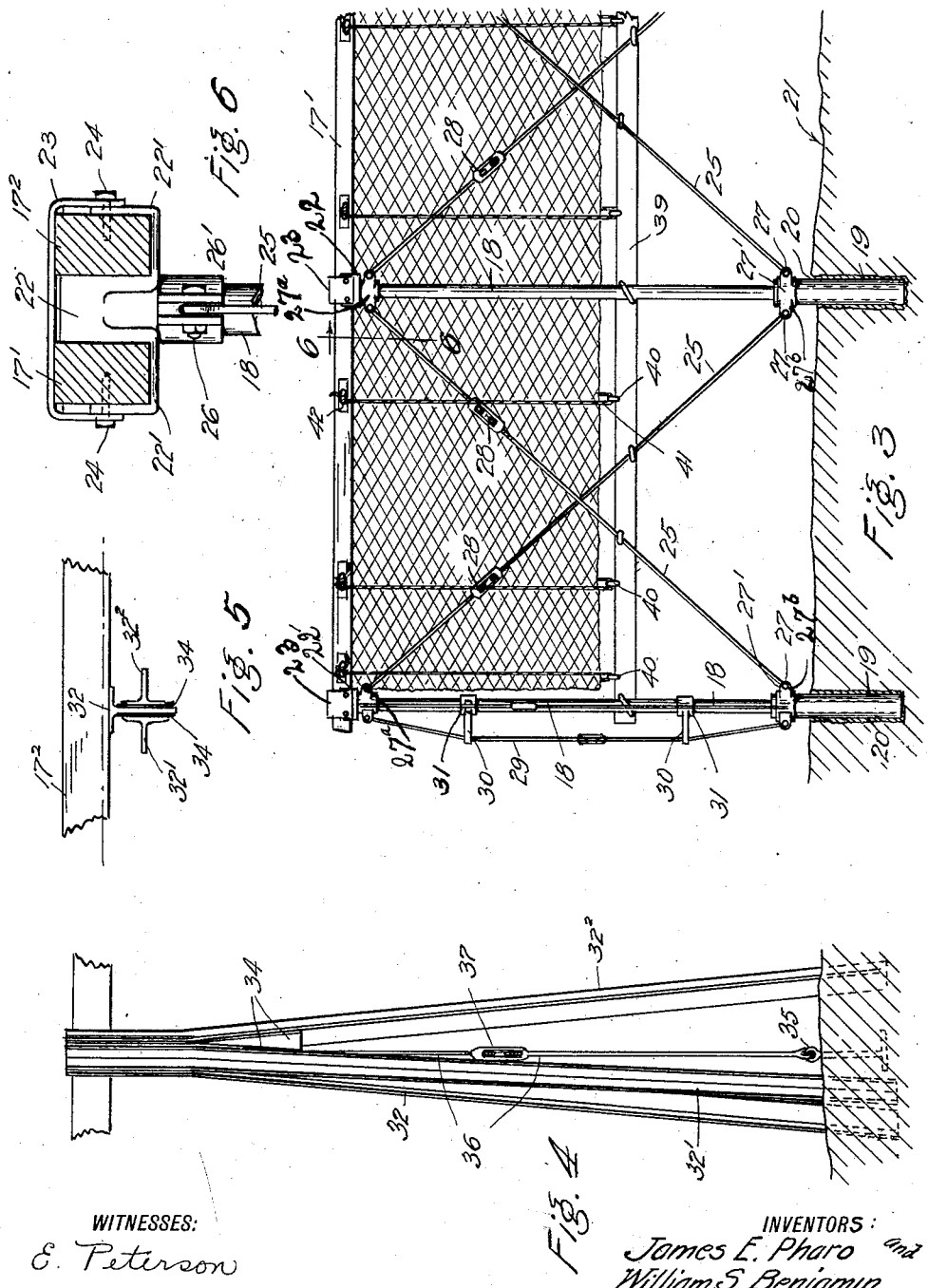

UNITED STATES PATENT OFFICE.

JAMES E. PHARO AND WILLIAM S. BENJAMIN, OF SEATTLE, WASHINGTON.

FISH-TRAP.

1,062,849. Specification of Letters Patent. Patented May 27, 1913.

Application filed January 12, 1912. Serial No. 670,830.

*To all whom it may concern:*

Be it known that we, JAMES E. PHARO and WILLIAM S. BENJAMIN, citizens of the United States, residing at Seattle, in the county of King and State of Washington, have invented certain new and useful Improvements in Fish-Traps, of which the following is a specification.

This invention relates to fish traps; and its object is the improvement in the construction of the framework to which the trap netting is attached and affording a trap which is adapted to be removably set up and operated in water having a shifting bottom or otherwise.

A further object of the invention is the provision of a durable and relatively inexpensive framework of this character and which may be readily erected at selected situations or removed therefrom; and may be capable of withstanding the strains or stresses to which it may be subjected in exposed places.

The invention is illustrated in the accompanying drawings, in which—

Figure 1 is a diagrammatic plan view of the ordinary type of fish traps with our invention applied thereto. Fig. 2 is a side elevation of the same. Fig. 3 is a fragmentary end elevation taken at the left hand side of Fig. 1. Fig. 4 is an elevational view of one of the tower supports such as utilized for the trap "lead". Fig. 5 is a top plan view of the support shown in the preceding view. Fig. 6 is a detail cross sectional view taken through 6—6 of Fig. 3.

Referring to Fig. 1, 10 designates what is conventionally known in the art as the trap "pot", 11 is the "spiller", and 12 and 13 are the "hearts". The pot 10 communicates with the spiller and also with the adjacent heart 12 while the latter communicates with the next heart 13. Extending from one side of the entrance 14 to the outer heart 13 is a wall 15 or "lead", so called, for directing the fish into said outer heart. Such members are provided with walls of netting while in addition thereto the pot and spiller are provided with floors of netting which are joined to the respective walls of the several compartments to furnish bag-like nets therefor. Both of said nets depend by their upper edges from horizontal headers, as 17′, Figs. 3 and 6, of the trap framework and these nets are further characterized by being adapted to be raised above the water for emptying them of fish entrapped therein. The netting for the walls of the hearts and for the lead are, however, secured at both their upper and lower edges, respectively, to the headers $17^2$ and tie lines $17^3$ provided therefor.

The aforedescribed general arrangement of the trap parts is according to a customary and advantageous practice generally existing in the construction of fish traps; and have heretofore been erected by the use of a frame structure comprised of driven piles connected by headers and stringers; or in lieu of such frame structure the trap and netting which constitutes the walls of the trap elements are hung from floats.

In the present invention the frame work of the trap proper, that is for the walls of the pot 10, spiller 11 and hearts 12 and 13, is formed of posts 18 having their lower ends inserted within tubular receptacles or sockets 19 which, in turn, are fixedly secured in holes 20 bored or drilled in the rock bed 21 whereat the trap is to be located. Such sockets are suitably disposed to be in rows to suit the various walls of the trap elements, and are spaced at distances appropriate to the heights of the different posts which are accommodated and to the conditions of exposure to waves, etc., peculiar to the location. Said sockets are secured in place by setting them in cement and are of lengths to extend a distance above the surface of the rock.

Above the water level the posts are each surmounted by a cap 22 provided with two oppositely directed bracket arms 22′ (Fig. 6) which support the members 17′ and $17^2$ of said headers at the inner and outer sides of the boundary walls of the referred to trap elements and upon both sides of the partition walls of the same. As illustrated, said bracket arms are formed to embrace the header members upon the inner and outer sides of each and which are further secured by a strap 23 extending over the members and connected at its ends, as by bolts 24, with the ends of the bracket arms and also with the members.

25 represent diagonally arranged rods which are connected with the posts below the caps 22 of each and with the sockets 19 of the adjacent posts. The connection between a rod and a post is desirably accomplished by forming an eye on the former to receive a bolt 26 extending through apertured ears 27$^a$ provided on a two-part collar 26′ which is clamped to the post through the instrumentality of such bolts. The connection between a rod and a socket is similarly accomplished; that is to say, by means of a bolt 27 for the rod eye engaging in apertured ears 27$^b$ of a clamping collar 27′. Said rods are each made of two parts with a turn-buckle coupling 28 operating upon screw threads provided upon the ends of the rod parts to impart tension upon the rods to afford in coöperation with the posts a rigid truss. By connecting the rods with the posts from near their tops and the sockets of the adjacent posts it is obvious that the rods exercise the further function of maintaining the posts against withdrawal from the sockets.

At the outer corners of the frame for the pot and spiller, as indicated by A in Fig. 1, we provide reinforcing trusses for rendering the corner-posts thereat sufficiently rigid to withstand the bending strains to which they are liable. Such reinforcing trusses, as best shown in Fig. 3, each comprise a rod 29 connected at its upper end with the like end of post, while its lower end is connected with the socket for the post. Intermediate its length the rod 29 is offset from the post by means of spaced bars or struts 30 extending from sleeves 31 provided on the post.

Instead of using posts like those above described, we employ for the lead a plurality of suitably spaced towers. Each such tower comprises a number of bars, 32, 32′, 32$^2$ being shown in the views, Figs. 4 and 5, having their upper ends joined together and their lower ends are spread to afford legs which are inserted in suitably disposed inclined holes provided therefor in the bed rock, and at the proper station.

The bars from which the towers are built are desirably of the type conventionally known as T-bars and in assembling the same and for joining them at the top, there is placed against the web of the bar 32 plates 34 and against the latter are the flanges of the other bars 32′ and 32$^2$. Bolts or rivets are then utilized to bind them firmly in place. Said plates are advantageously of lengths to extend some distance below where the bars begin to diverge to serve as gussets in tying the bar 32 with each of the others.

Secured to these plates and also with an eyebolt 35 which is firmly secured in the rock bed is a two-part rod 36 coupled by a turnbuckle nut 37. The purpose of the latter is to shorten the effective length of the rod 36 for holding down a tower. Header timbers 17$^2$ are desirably connected to the tops of the towers, most conveniently by being bolted to the flanges of the bars 32 of the same.

Stringers 39 connect the adjacent posts of the pot and spiller elements at a distance below the water surface. Attached to said stringers are eyebolts 40 through which are rove down-haul lines 41 for the lower ends of the nets of the referred to elements. The other ends of the lines 41 are connected to cleats 42 which are secured to the headers 17′.

When the nets are to be raised for emptying or other purposes, the lines are disengaged from the cleats and a net hauled up as ordinary. To replace a net in operative position, the free ends of the lines are pulled up to cause the ends which are attached to the net to be drawn down.

In assembling the trap frame the posts 18 are first set in the various sockets 19 and secured in place and also braced against swaying by connecting the stays 25 and tightening them up by means of the turn buckles 28. The towers, designated by B in Figs. 1 and 2, are then successively erected and secured by the rods 36 and turn buckles therefor, as explained. The stringers 39 and headers 17′′ and 17$^2$ are then secured in their proper positions to the posts and towers. The nets or netting may then be secured in suitable manner to the framework and thereby complete a serviceable trap having members which may be readily put in place or removed.

What we claim, is:—

1. In a fish-trap of the class described, of pot and heart frames comprised of pluralities of posts, brackets carried by the upper ends of said posts, headers received in said brackets and connecting the upper ends of the posts, socket members fixedly secured in locations to receive the lower ends of the respective posts, ears carried by the brackets and ears carried by the upper ends of the sockets, and rods connected to the ears of the brackets and sockets for connecting each of the posts with the socket provided for the adjacent post and serving to hold the posts in upright positions and also retain the same against accidental withdrawal from the socket members.

2. In a fish-trap of the class described, of pot and heart frames constituted of spaced posts, a bracket on the top of each post having U-arms, horizontal headers received in said arms and connecting the posts, caps secured to said headers and arms, braces extending diagonally between the adjacent posts, reinforcing trusses for certain of said posts connecting the socket of a post to its bracket and means whereby the lower ends of the posts are removably secured to maintain the aforesaid frames in operative positions upon a submerged rock bed.

Signed at Seattle, Wash., this 2d day of January 1912.

JAMES E. PHARO.
WILLIAM S. BENJAMIN.

Witnesses:
WILLIAM H. GORHAM,
JENNIE GOODERHAM.